April 24, 1928.
S. D. MYERS
1,667,294
BELT FASTENING AND RIVETING APPARATUS
Filed Feb. 12, 1927     2 Sheets-Sheet 1
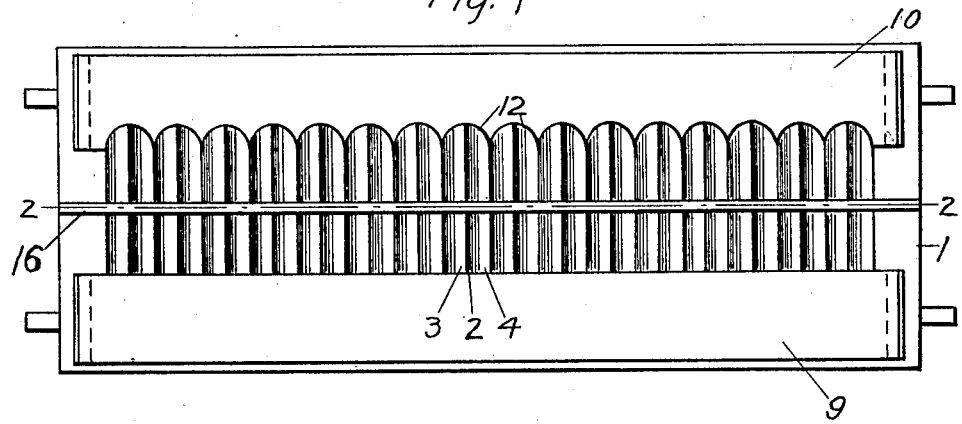
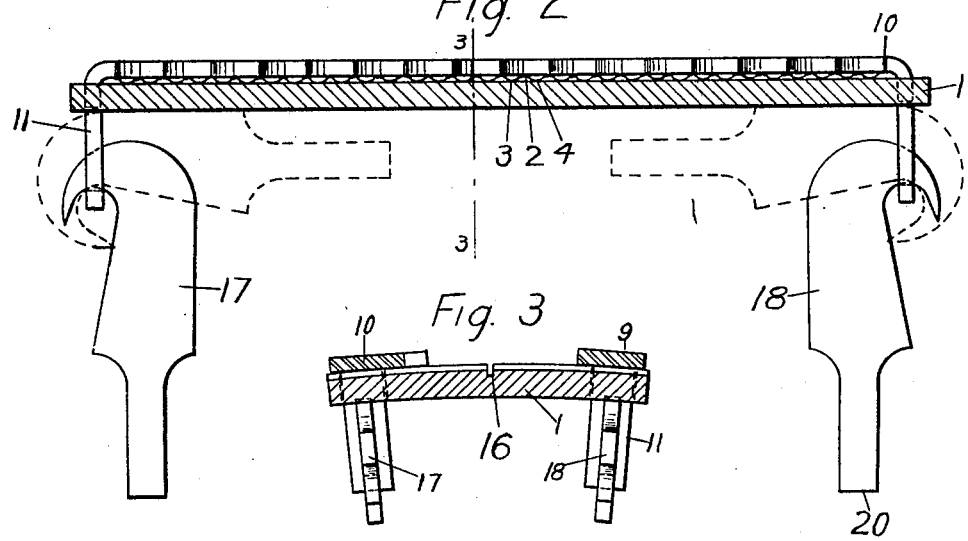
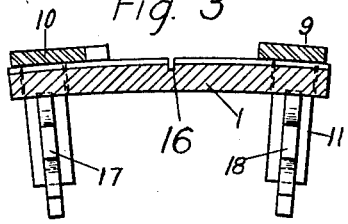
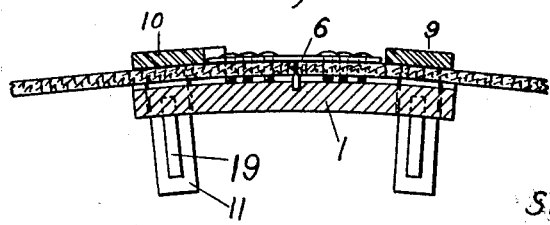
INVENTOR
STANLEY D. MYERS
BY
A. D. T. Libby
ATTORNEY April 24, 1928.
S. D. MYERS
1,667,294
BELT FASTENING AND RIVETING APPARATUS
Filed Feb. 12, 1927 2 Sheets-Sheet 2
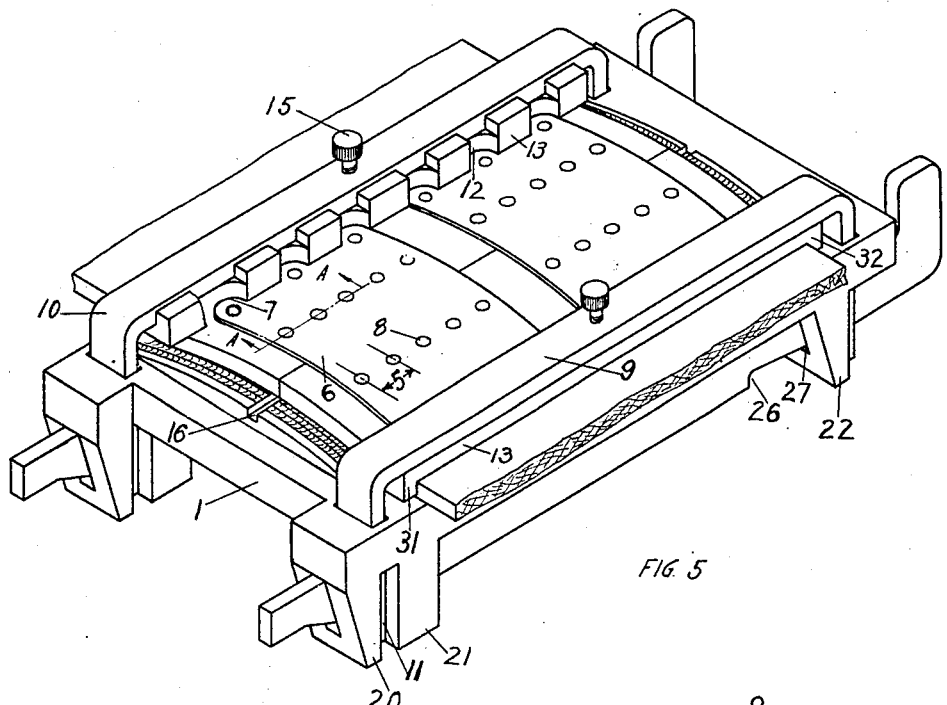
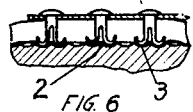
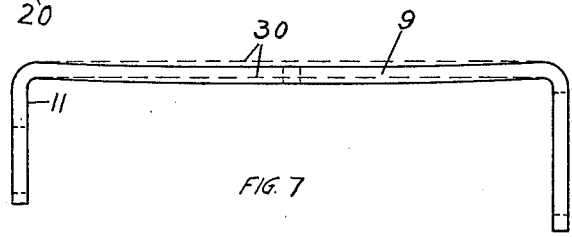
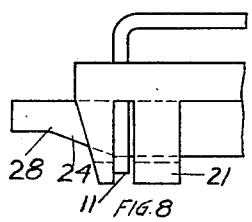
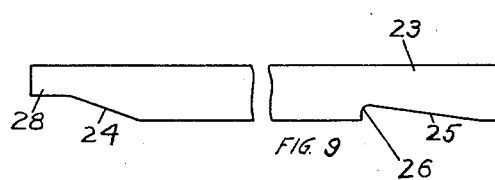
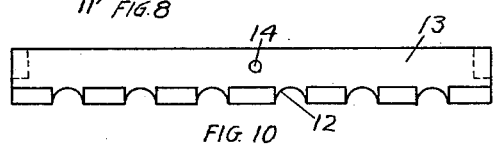
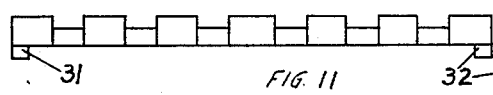
INVENTOR
STANLEY D. MYERS
BY
A. D. Libby
ATTORNEY Patented Apr. 24, 1928.

1,667,294

UNITED STATES PATENT OFFICE.

STANLEY D. MYERS, OF ROSELAND, NEW JERSEY.

BELT FASTENING AND RIVETING APPARATUS.

Application filed February 12, 1927. Serial No. 167,638.

This application which is a continuation in part of my application Serial Number 133,480, filed September 3rd, 1926, relates to means for splicing belts, wherein a particular style of belt fastener is used. The fastener which is contemplated in this application is that generally known in the trade as the "Crescent". This type of fastener consists of a metal plate varying in dimensions according to the use and characteristics of the belt to which they are applied. These metal fasteners or "grip" plates are, according to past practice, founded on the directions given by the manufacturers thereof, attached by placing the belt ends over a block of wood, and then driving a special form of split rivet through the belt, it being understood that the grip plates are provided with holes to receive the rivets. According to the present practice, after the rivets have been driven through the belt as above described the belt is turned over and the prongs of the rivet are bent over by a hammer, so as to clinch the ends thereof below the surface of the pulley side of the belt. Where wide and heavy belts are used, for example in conveyors for heavy goods, such as stones, it is difficult to turn the belts over and much time and effort is consumed in the riveting operations.

It is therefore the principal object of my invention to provide an apparatus designed especially for the application of this style of grip plate to the belt ends, whereby simultaneously with the driving operating of the rivets thru the belt they are clinched in a secure manner, so that when the last rivet is driven, the complete splicing is finished, and the belt is ready for use, when it is removed from the fixture or belt fastening and riveting apparatus.

Another object of my invention is to provide an apparatus for splicing belt ends in which proper alignment of the belt is assured, so that after the splicing or riveting operation has been performed the belt will run true over the pulleys.

Another object of my invention is to provide means included as a part of the apparatus, which positions the grip plates in the proper manner, so that the complete riveting operation is assured.

These and other objects will be apparent to one skilled in this art, after a reading of the specification taken in connection with the annexed drawing, wherein—

Figure 1 is a plan view of the apparatus before the belt is inserted.

Figure 2 is a vertical longitudinal section on the line 2—2 of Figure 1, the cam locking means being shown in full lines in position to permit the clamps to be raised for inserting the belt, and also showing in dotted lines the position of the cam locking means when holding the belt in the apparatus.

Figure 3 is a transverse view of Figure 2 on the line 3—3.

Figure 4 is a view similar to Figure 3, but showing the belt in position, and likewise a belt fastener or grip plate.

Figure 5 is a perspective view of the apparatus showing the belt ends in position, and likewise a pair of grip plates, but with a slightly different style of cam locking means than that shown in Figure 2.

Figure 6 is a fragmentary sectional view on the line A—A of Figure 5.

Figure 7 is a side view of one of the clamps shown in Figures 1 and 5.

Figure 8 is a fragmentary side view showing the end of the clamp and the cam engaging member at one end of the apparatus.

Figure 9 is a side view of the locking cam member shown in Figure 5.

Figure 10 is a plan view of one of the guide members on the clamps shown in Figure 5.

Figure 11 is a side view of Figure 10, while Figure 12 is an end view of Figure 10, the same being turned 90 degrees.

Referring now to the details, wherein like numbers refer to corresponding parts in the various views: 1 is a base, preferably made of cast iron, or cast steel and as shown in Figures 1 and 2, is in the form of a plate. Preferably the upper surface of the base or plate 1 is made according to its width, arcuate in form to simulate the arc of a pulley. Extending across the upper surface for a considerable portion of the width, is a series of transverse ridges 2, sloping down to grooves 3 and 4, on each side of the ridges. In other words, a ridge 2 is followed by a groove 4. These ridges are spaced a distance apart 5, in the plate 1 (see Figure 5) to correspond with the arrangement of holes in the grip plates 6. In the form shown in Figure 1, the special grip plates 6, herein referred to, are provided with bosses 7 usually symmetrically arranged and these bosses are utilized to properly position the grip plates 6 on the apparatus, so as to insure that the holes 8 in the grip plates come over some ridge 2, in the base member 1.

In the form shown in Figure 1, the belt ends are held to the base 1, by clamps 9 and 10, which have downwardly bent ends 11, passing through slots or holes in the base 1. In Figure 1, the belt clamp 10, is provided with recesses 12, to receive the bosses 7 of the plates 6.

In Figure 5 instead of the clamp 10 being provided with recesses 12, I provide a separate guide clamp or member 13 which has the recesses 12 made therein.

The member 13 is held by means of a screw 15 carried by the clamp 10 and engaging a threaded screw hole 14, as is clearly shown in Figure 5. In the perspective view shown in Figure 5, the grooves 12, in one member 13 are hidden by the clamp 9. However it is to be understood that two of the guide members 13 may not be used as I have found in many cases, one is sufficient, which is evident from an inspection of Figure 1, wherein only one of the clamps, namely 10, is provided with the recesses 12, to receive the bosses 7 of the grip plates 6.

In order to insure that the belt ends are brought into proper alignment so that the belt will run true, after it has been spliced, I provide a longitudinal slot 16 across the face of the base 1. When placing the belt ends in position on the apparatus a square is set in the slot 16 and the belt ends are brought against the square and if the ends are not true, they can be trimmed so as to make a proper joint as indicated by the square. The clamps 9 and 10 carrying the guide member 13 if used, are then put in position, and the lugs 31 and 32 on the guide member assist in holding the belt from shifting. As shown in Figure 2, the cam members 17 and 18 are turned upwardly and driven outwardly as indicated by the dotted lines, it being understood that the ends 11 of the clamps are provided with slots 19 for the members 17 and 18. While the members 17 and 18 are shown positioned as indicated in Figure 2, it is to be understood that they can be positioned in the slots 19, in reverse direction to that shown and when so positioned hammer blows can be applied to the ends 20 more conveniently than when the cam members 17 and 18 project inwardly as shown in dotted lines.

It is also to be understood that while the clamp 9 is shown without the recesses 12, a duplicate of clamp 10 may be used instead.

In Figure 5, the base 1 is provided with a plurality of downwardly extending lugs for the base 1 to rest on. These lugs are indicated by the numerals 20, 21 and 22. The lugs 20 and 21 are spaced a short distance apart to form a guideway for the end 11 of the belt clamps 9 and 10. The reason for this will be obvious by reference to Figure 9, which shows a double ended cam member 23, having cam surfaces 24 and 25 to work in the slots 19 in opposite ends 11 of the clamps, whereby the clamps are drawn securely in position to hold the belt ends in place. Each cam member 23 is provided with a notch 26, that acts to engage the inner side of the lug 22, when the key is moved to release position, so that the cam key is prevented from being withdrawn entirely from the lugs, and in order to prevent the end 28 of the cam key member 23, from dropping downwardly, the end 28 thereof, after it has been withdrawn from the slot 11 in the corresponding end of the clamp, still rests in the lug 21, when the notch 26 is in engagement with the edge 27 of the lug 22. When the cam members 23 are in release position, as just described the clamps 9 and 10 (of Figure 5) can be raised up and the ends associated with the lugs 20 and 21 can be pulled entirely out of the slot in the base, it being understood that the left hand end 11 (see Figure 7) of the clamps is preferably shorter than the right hand end which latter end is provided with a slot considerably longer than the slot in the left hand end. After the left hand end is raised above the base, the belt ends can be slid into the apparatus or fixture, after which the clamps are dropped into position, and the key members 23 driven home, by blows on the ends 29, thus drawing the clamps 9 and 10 into position as described.

Preferably the clamps 9 and 10 are made of spring steel and are normally bowed as indicated by the full lines in Figure 7, but when the cam members 23 are driven home to clamp the belt ends the clamps 9 and 10 straighten out as indicated by the dotted lines 30 so as to provide a straight line engagement across the entire width of the belt ends, thus clamping the belt very securely in position.

When the guide clamps 13 are used they are positioned as indicated in Figure 5, in the manner already described, and the clamps 9 and 10 act to force these guide members against the surface of the belt. Besides acting as supports for the base 1, and as guides for the ends 11 of the clamps; the lugs 20, 21 and 22 are so formed as to prevent the ends 11 from being bent out of alignment when the cam members 23 are driven in to draw the clamps down against the belt.

After the belt has been placed in position together with the grip plates 6 in the manner described, and as illustrated in Figure 5, the special split rivets are placed in the holes 8 and driven through the belt, it being understood that the rivets are so held that the plane of the slot in the rivet is parallel with the ridges 2. As the prongs of the rivet engage the opposite sides of the ridge, they are directed by the grooves 3 and 4 in a manner as indicated in Figure 6, and are turned upward so as to be forced into the pulley surface of the belt, whereby when they are driven all the way home, the inner surface of the belt is left perfectly smooth and no further clinching operation is required.

From what has been said it will be obvious that many changes may be made in the details entering into the construction of my belt fastening and riveting apparatus without departing from the spirit of my invention or the scope of the appended claims.

Having thus described my invention, what I claim is:

1. An apparatus for fastening and riveting belts utilizing perforated metal grip plates and rivets having split ends comprising; a base member to receive the two ends of the belt, said base member having a series of transverse ridges and grooves, a pair of clamps disposed one on each side of the base member so as to engage a belt end, said clamps being spaced apart to receive said grip plates therebetween. means for drawing the clamps tightly down onto the belt ends, and means associated with at least one of the clamps to position said grip plates so the perforations in the grip plates will be substantially positioned over ridges in the base member whereby when a split rivet is inserted in a perforation and driven through the belt the opposite portions of the rivet will follow the contour of the grooves on opposite sides of a given ridge and be forced by the next adjacent ridge to enter the pulley side of the belt thereby clinching the rivet.

2. An apparatus for fastening and riveting belts, utilizing perforated metal grip plates and rivets having split ends comprising; a base member to receive the two ends of the said base member having a series of transverse ridges and grooves and a longitudinal slot to receive a squaring device by which the ends of the belt are properly aligned, a pair of clamps carried by the base member in spaced relationship so as to engage the opposed belt ends, means coacting between the base member and the clamps for drawing them tightly against the belt ends, and means for positioning the grip plates between the clamps so the perforations in the grip plates will be substantially positioned over ridges in the base member whereby when a split rivet is inserted in a perforation and driven through the belt the opposite portions of the rivet will follow the contour of the grooves on opposite sides of a given ridge and be forced by the next adjacent ridge to enter the pulley side of the belt thereby clinching the rivet.

3. An apparatus for fastening and riveting belts, utilizing perforated metal grip plates and rivets having split ends comprising; a base member to receive the two ends of the belt, said base member having a series of transverse ridges and grooves, a pair of clamps disposed one on each side of the base member so as to engage a belt end, said clamps being spaced apart to receive said grip plates therebetween, and having downwardly bent ends passing through the base member, said bent ends having openings therein, cam members passing through said openings and adapted when operated to locking position to draw the clamps securely against the belt ends, and means for positioning the grip plates between the clamps so the perforations in the grip plates will be substantially positioned over ridges in the base member whereby when a split rivet is inserted in a perforation and driven through the belt the opposite portions of the rivet will follow the contour of the grooves on opposite sides of a given ridge and be forced by the next adjacent ridge to enter the pulley side of the belt thereby clinching the rivet.

4. An apparatus for fastening and riveting belts utilizing perforated metal grip plates and rivets having split ends comprising; a base member to receive the two ends of the belt, said base member having a series of transverse ridges and grooves, a pair of clamps disposed one on each side of the base member so as to engage a belt end, said clamps being spaced apart to receive said grip plates therebetween, said clamps being when not under tension bowed at their central portions toward the base, means for engaging the extremities of the clamps to draw them toward a straight position whereby they engage and clamp the belt ends across their whole width, and means for positioning the grip plates between the clamps so the perforations in the grip plates will be substantially positioned over ridges in the base member whereby when a split rivet is inserted in a perforation and driven through the belt the opposite portions of the rivet will follow the contour of the grooves on opposite sides of a given ridge and be forced by the next adjacent ridge to enter the pulley side of the belt thereby clinching the rivet.

5. An apparatus for fastening and riveting belts utilizing perforated metal grip plates and rivets having split ends comprising; a base member to receive the two ends of the belt, said base member having a series of transverse ridges and grooves, and a plurality of downwardly projecting lugs, said lugs having slots therethrough, a pair of clamps arranged one on each side of the base and having downwardly turned ends passing through the base adjacent said lugs, said clamp ends having slots adapted to be brought into alignment with the slots in the lugs, slidable cam members carried by said lugs and passing through the slots in the clamp ends for drawing the clamps securely against the belt ends, and means for positioning the grip plates between the clamps so the perforations in the grip plates will be substantially positioned over ridges in the base member whereby when a split rivet is inserted in a perforation and driven through the belt, the opposite portions of the rivet will follow the contour of the grooves on opposite sides of a given ridge and be forced by the next adjacent ridge to enter the pulley side of the belt thereby clinching the rivet.

6. An apparatus for fastening and riveting belts utilizing perforated metal grip plates and rivets having split ends comprising; a base member to receive the two ends of the belt, said base member having a series of transverse ridges and grooves, a pair of clamps disposed one on each side of the base member so as to engage a belt end, said clamps being spaced apart to receive said grip plates therebetween, means for drawing the clamps tightly down onto the belt ends, and a guide plate detachably carried by at least one of the clamps for positioning the grip plates between the clamps so the perforations therein will be substantially positioned over ridges in the base member whereby when a split rivet is inserted in a perforation and driven through the belt the opposite portions of the rivet will follow the contour of the grooves on opposite sides of a given ridge and be forced by the next adjacent ridge to enter the pulley side of the belt thereby clinching the rivet.

7. An apparatus for fastening and riveting belts utilizing perforated metal grip plates and rivets having split ends comprising; a base member to receive the two ends of the belt, said base member having a series of transverse ridges and grooves, a pair of clamps disposed one on each side of the base member so as to engage a belt end, said clamps being spaced apart to receive said grip plates therebetween, means for drawing the clamps tightly down onto the belt ends, and a guide plate, detachably carried by each of said clamps, having lugs for engaging the side of the belt end to prevent lateral movement thereof and also having notches to receive projections on the grip plates so said grip plates will be substantially positioned over ridges in the base member whereby when a split rivet is inserted in a perforation and driven through the belt the opposite portions of the rivet will follow the contour of the grooves on opposite sides of a given ridge and be forced by the next adjacent ridge to enter the pulley side of the belt thereby clinching the rivet.

8. An apparatus for fastening and riveting belts utilizing perforated metal grip plates and rivets having split ends comprising; a base member to receive the two ends of the belt, said base member having a series of transverse ridges and grooves, and a longitudinal slot to receive a squaring device by which the ends of the belt are properly aligned, a pair of clamps carried by the base member in spaced relationship normally bowed toward the base, manually operable means co-acting between the base member and the ends of the clamps acting to straighten the clamps to secure effective clamping across the full width of the belt ends, and a guide plate detachably carried by at least one clamp for positioning the grip plates between the clamps so the perforations therein will be substantially positioned over ridges in the base member whereby when a split rivet is inserted in a perforation and driven through the belt the opposite portions of the rivet will follow the contour of the grooves on opposite sides of a given ridge and be forced by the next adjacent ridge to enter the pulley side of the belt thereby clinching the rivet.

9. An apparatus for fastening and riveting belts utilizing perforated metal grip plates and rivets having split ends comprising; a base member to receive the two ends of the belt, means for assisting in properly aligning the belt ends in squared relationship on the base, a clamp for each belt end, means for drawing the clamps securely across the belt ends, means for positioning the grip plates between the clamps, and means on the base for directing the split rivet ends after they have been placed in the plate perforations and driven through the belt, so they will be clinched into the pulley side of the belt.

10. An apparatus for fastening and riveting belts utilizing perforated metal grip plates and rivets having split ends comprising; a base member to receive the two ends of the belt, a pair of clamps having a length greater that the width of the belt to be spliced, positioned one on each side of and carried by the base, means for drawing the clamps securely across the belt ends, means associated with at least one of the clamps for properly positioning the grip plates between the clamps, and means on the base for directing the split rivet ends after they have been placed in the plate perforations and driven through the belt, so they will be clinched into the pulley side of the belt.

11. An apparatus for fastening and riveting belts utilizing perforated metal grip plates and rivets having split ends comprising; a base member to receive the two ends of the belt, a pair of clamps having a length greater than the width of the belt to be spliced, positioned one on each side of and carried by the base, said clamps being normally bowed so their central portions engage the belt before their extremities, means engaging the ends of the clamps for drawing them securely across the belt ends, adjustable and detachable means associated with at least one of the clamps for properly positioning the grip plates between the clamps, and means on the base for directing the split rivet ends after they have been placed in the plate perforations and driven through the belt, so they will be clinched into the pulley side of the belt.

12. An apparatus for fastening and riveting belts utilizing perforated metal grip plates, and rivets having split ends comprising; a base member to receive the two ends of the belt, said base member having a series of transverse ridges and grooves, and a plurality of downwardly projecting lugs on opposite edges of the base, the lugs at one end being arranged in pairs spaced a short distance apart, said lugs having slots therethrough, a pair of clamps arranged on opposite edges of the base corresponding to the lugs and having downwardly turned ends passing outside the lugs at one end of the base and between the spaced lugs at the other end of the base, said clamps having slots therein, slidable double ended cam members carried in the lug slots and passing through the slots in clamp ends, means on said cam members cooperating with the single lug at one end of the base to limit the release position of the cam member so the end passing between the pair of spaced lugs can just be withdrawn from the clamp slot but not out of the inner lug whereby this end of the clamp may be raised to release the belt after the riveting is completed and means for positioning the grip plates between the clamps so the perforations in the grip plates will be substantially positioned over ridges in the base member whereby when a split rivet is inserted in a perforation and driven through the belt the opposite portions of the rivet will follow the contour of the grooves on opposite sides of a given ridge and be forced by the next adjacent ridge to enter the pulley side of the belt thereby clinching the rivet.

13. An apparatus for fastening and riveting belts utilizing perforated metal grip plates and rivets having split ends comprising; a base member to receive the two ends of the belt, a clamp for each belt end, means for drawing the clamps securely across the belt ends, means for positioning the grip plates between the clamps, and means on the base for directing the split rivet ends after they have been placed in the plate perforations and driven through the belt, so they will be clinched into the pulley side of the belt.

14. An apparatus for fastening and riveting belts utilizing perforated metal grip plates and rivets having split ends, comprising; a base member to receive the two ends of the belt, means for clamping the belt ends to the base, means for properly positioning the grip plates over the belt ends, and means on the base for directing the split rivet ends, after they have been placed in the plate perforations and driven through the belt, so they will be clinched into the pulley side of the belt.

15. An apparatus for fastening and riveting belts utilizing perforated metal grip plates and rivets having split ends comprising; a base member to receive the two ends of the belt, said base member having a series of transverse ridges and grooves, and means assisting in properly aligning the ends of the belt thereon, means for clamping the belt ends to the base, and means for properly positioning the grip plates between said clamping means and over the belt ends whereby when the split rivets are inserted in the plate perforations and driven through the belt, the split rivet ends will be, due to said ridges and grooves, clinched into the pulley side of the belt.

In testimony whereof, I affix my signature.

STANLEY D. MYERS.